(12) United States Patent
Ogasahara

(10) Patent No.: US 8,836,800 B2
(45) Date of Patent: Sep. 16, 2014

(54) IMAGE PROCESSING METHOD AND DEVICE INTERPOLATING G PIXELS

(75) Inventor: Takayuki Ogasahara, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 338 days.

(21) Appl. No.: 13/049,405

(22) Filed: Mar. 16, 2011

(65) Prior Publication Data

US 2011/0234824 A1 Sep. 29, 2011

(30) Foreign Application Priority Data

Mar. 25, 2010 (JP) ................................. 2010-069321

(51) Int. Cl.
*H04N 5/228* (2006.01)

(52) U.S. Cl.
USPC .................................... 348/208.6; 348/208.1

(58) Field of Classification Search
USPC .......... 348/208.4, 208.6, 208.5, 231.2, 231.3, 348/231.99, 222.1, 333.01, 333.05, 333.11, 348/208.99, 208.1
See application file for complete search history.

(56) References Cited

U.S. PATENT DOCUMENTS

| | | | | |
|---|---|---|---|---|
| 6,809,765 B1 * | 10/2004 | Tao | ............................... | 348/273 |
| 7,456,881 B2 * | 11/2008 | Hu | ............................... | 348/273 |
| 7,643,739 B2 * | 1/2010 | Sasaki et al. | ..................... | 396/55 |
| 2004/0207735 A1 * | 10/2004 | Kameyama et al. | .......... | 348/239 |
| 2006/0017813 A1 * | 1/2006 | Okubo et al. | .............. | 348/208.2 |
| 2006/0256231 A1 * | 11/2006 | Sasaki et al. | .................. | 348/373 |
| 2010/0053346 A1 * | 3/2010 | Mitsunaga | .................. | 348/208.6 |
| 2010/0201828 A1 * | 8/2010 | Mitsuya et al. | ............ | 348/208.6 |

FOREIGN PATENT DOCUMENTS

| | | |
|---|---|---|
| CN | 101668125 A | 3/2010 |
| JP | 11-75105 | 3/1999 |
| JP | 2003-78808 | 3/2003 |
| JP | 2004-229084 | 8/2004 |
| JP | 2007-82044 | 3/2007 |
| JP | 2008-11103 | 1/2008 |
| JP | 2009-171327 | 7/2009 |
| JP | 2010-62785 | 3/2010 |

OTHER PUBLICATIONS

Office Action issued May 22, 2012, in Japanese Patent Application No. 2010-069321 with English-language translation.
U.S. Appl. No. 13/353,537, filed Jan. 19, 2012, Ogasahara.
U.S. Appl. No. 13/352,891, filed Jan. 18, 2012, Ogasahara.

(Continued)

*Primary Examiner* — Nicholas Giles
(74) *Attorney, Agent, or Firm* — Oblon, Spivak, McClelland, Maier & Neustadt, L.L.P.

(57) ABSTRACT

According to one embodiment, an image processing method includes storing, in a frame memory, first and second images of continuously taken N (however, N is not less than 2) images, cutting an image as an image for correction from a plurality of reference areas of the first and second images stored in the frame memory, calculating such a hand shake correction amount that the first image and the second image overlap with high accuracy with the use of a plurality of images for correction of the first and second images and correcting the first image with the calculated hand shake correction amount, overwriting the corrected first image in the first image stored in the frame memory, composing the corrected first image and the second image to obtain a composite image, and overwriting the composited the composite image in the second image stored in the frame memory.

11 Claims, 8 Drawing Sheets

(56) References Cited

OTHER PUBLICATIONS

Office Action issued on Feb. 25, 2013 in the corresponding Chinese Patent Application No. 2011101091555 (with English Translation).

Combined Taiwanese Office Action and Search Report issued Jul. 25, 2013 in Patent Application No. 100108721 (with English language translation of Office Action).

Office Action mailed May 20, 2014, in Chinese Patent Application No. 201110109155.5 (with English-language translation).

* cited by examiner

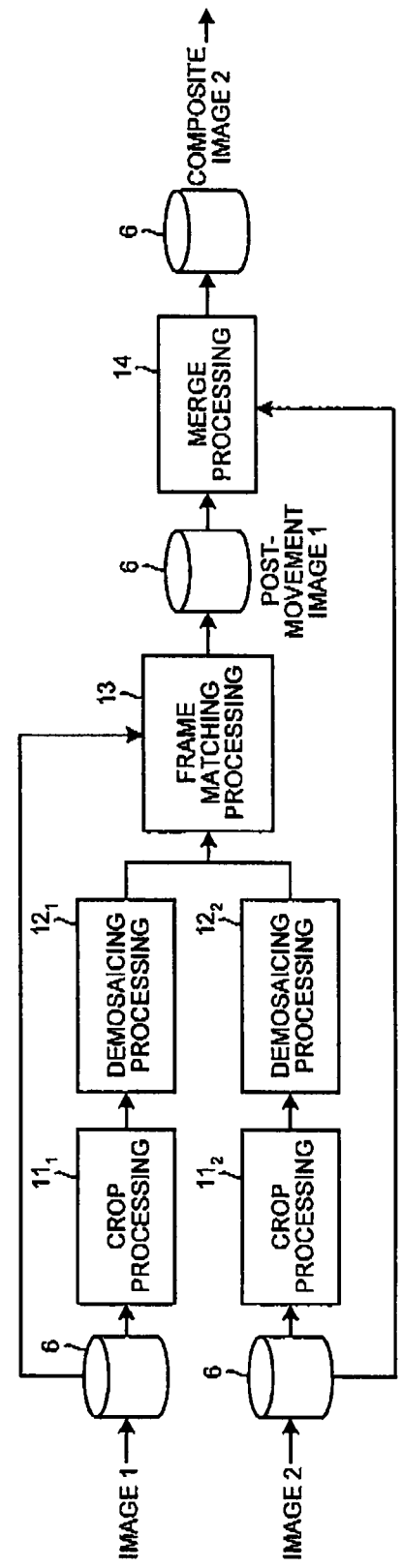

● TARGET PIXEL

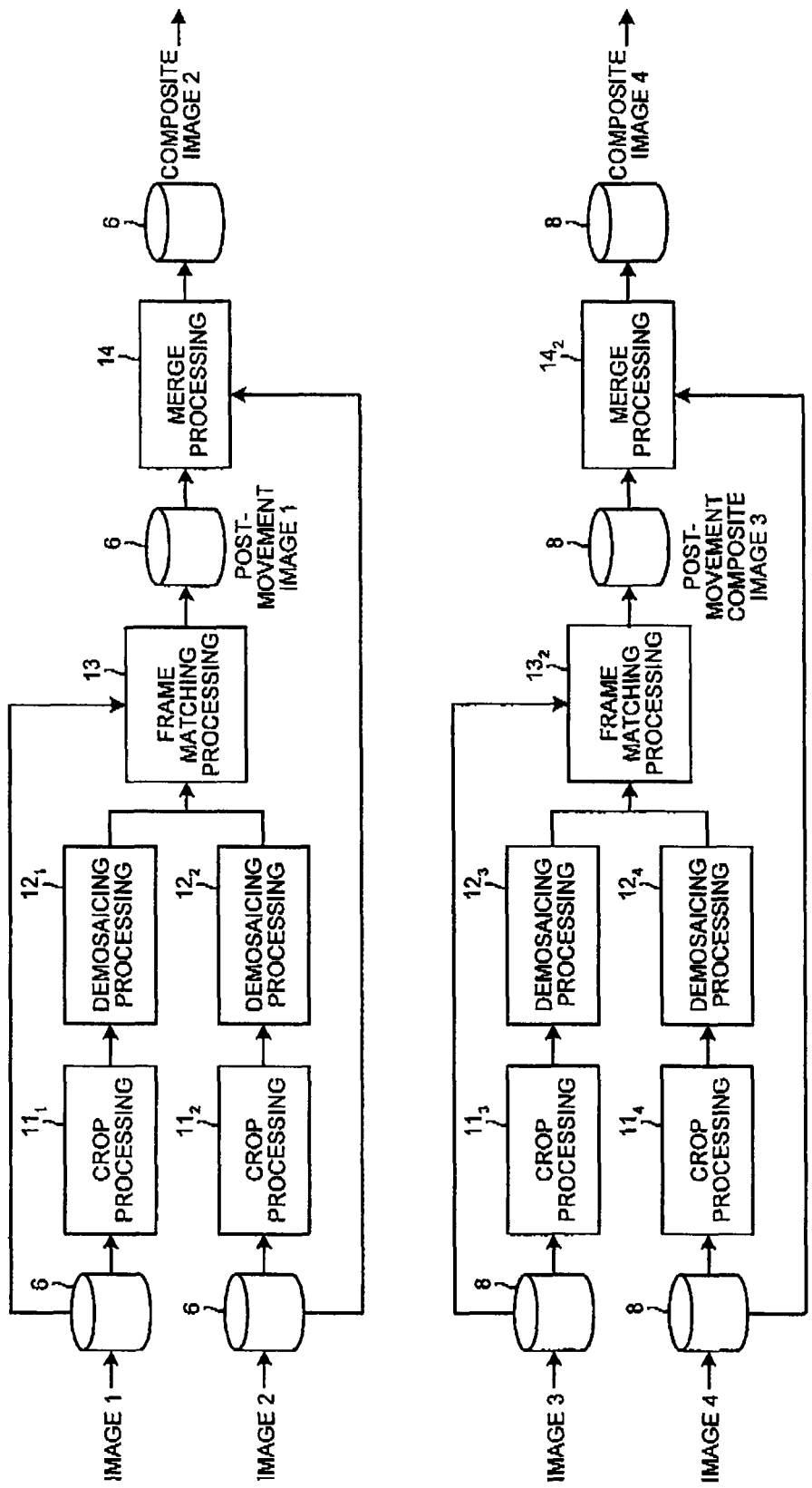

IMAGE PROCESSING METHOD AND DEVICE INTERPOLATING G PIXELS

CROSS-REFERENCE TO RELATED APPLICATIONS

This application is based upon and claims the benefit of priority from Japanese Patent Application No. 2010-069321, filed on Mar. 25, 2010; the entire contents of which are incorporated herein by reference.

FIELD

Embodiments described herein relate generally to an image processing method and device.

BACKGROUND

In a camera module used in a digital camera and so on, a method of correcting hand shake includes an electronic method (for example, see Japanese Patent Laid-Open Publication No. 11-75105) of performing calculation from image data, received from a light-receiving element at the time of recording, and performing correction and an optical method of adjusting an optical axis physically.

In a camera module, it is preferable that the thickness of a lens module is reduced in accordance with requirements for reduction of the thickness and size. In the electronic method, a module having a dedicated function is not required to be mounted, and therefore, the electronic method is more excellent than the optical method in terms of the reduction of the thickness and size.

In a general electronic hand shake correction, a plurality of images are continuously taken, and a large number of images are stored in a frame memory. Thereafter, blur due to hand shake is reduced in the post-stage signal processing.

However, in the related art electronic hand shake correction, since a high-capacity frame memory is used, cost may be significantly increased.

BRIEF DESCRIPTION OF THE DRAWINGS

FIG. 3 is a view for explaining a processing flow of hand shake correction in the image processing device;

FIG. 10 is a view showing a processing flow when a shutter is operated twice, and the hand shake correction is performed using two images.

DETAILED DESCRIPTION

In general, according to one embodiment, an image processing method includes storing, in a frame memory, first and second images of continuously taken N (however, N is not less than 2) images, cutting an image as an image for correction from a plurality of reference areas of the first and second images stored in the frame memory, calculating such a hand shake correction amount that the first image and the second image overlap with high accuracy with the use of a plurality of images for correction of the first and second images and correcting the first image with the calculated hand shake correction amount, overwriting the corrected first image in the first image stored in the frame memory, composing the corrected first image and the second image to obtain a composite image, and overwriting the composited the composite image in the second image stored in the frame memory.

Exemplary embodiments of an image processing method and device will be explained below in detail with reference to the accompanying drawings. The present invention is not limited to the following embodiments.

The components in the following embodiments include ones easily assumed by those skilled in the art or substantially the same ones.

First Embodiment

Figure 1:
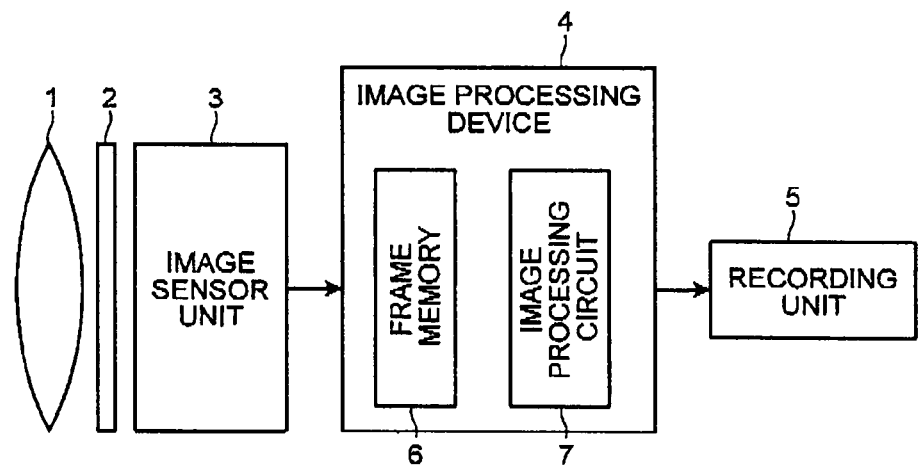
FIG. 1 is a block diagram showing one example of a configuration of an image recording apparatus provided with an image processing device according to a first embodiment.

FIG. 1 is a block diagram showing one example of a configuration of an image recording apparatus provided with an image processing device according to a first embodiment. As shown in FIG. 1, the image recording apparatus is provided with an imaging lens 1, an IR cut filter 2, an image sensor unit 3, an image processing device 4, and a recording unit 5. In the example shown in FIG. 1, although the image sensor unit 3 and the image processing device 4 are separated, the image sensor unit 3 may include the image processing device 4.

The imaging lens 1 constitutes an optical system for taking in light from a subject and forms a subject image in the image sensor unit 3. The IR cut filter 2 removes infrared light from the light taken in by the imaging lens 1. The image sensor unit 3 converts the light taken in by the imaging lens 1 into a signal charge to thereby image the subject image. The image sensor unit 3 takes in pixel values of R (red), G (green), and B (blue) in an order corresponding to a Bayer array to thereby generate an analog image signal. The image sensor unit 3 further converts the obtained analog image signal into a digital image signal to output the digital image signal to the image processing device 4.

The image processing device 4 applies various image processing to the digital image signal input from the image sensor unit 3 to output the processed digital image signal to the recording unit 5. The image processing device 4 is provided with a frame memory 6 used as a working region when hand shake correction and so on are performed and an image processing circuit 11 including a hand shake correction function, a shading correction function, and a white balance adjustment function. The recording unit 5 records image data, input from the image processing device 4, in a memory and a recording medium.

Figure 2A:
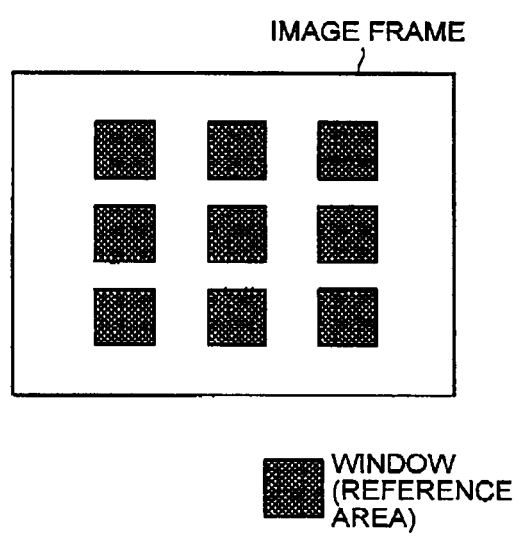
FIGS. 2A and 2B are views for explaining a reference area for hand shake correction of an image and a moving direction of an image.
Figure 2B:
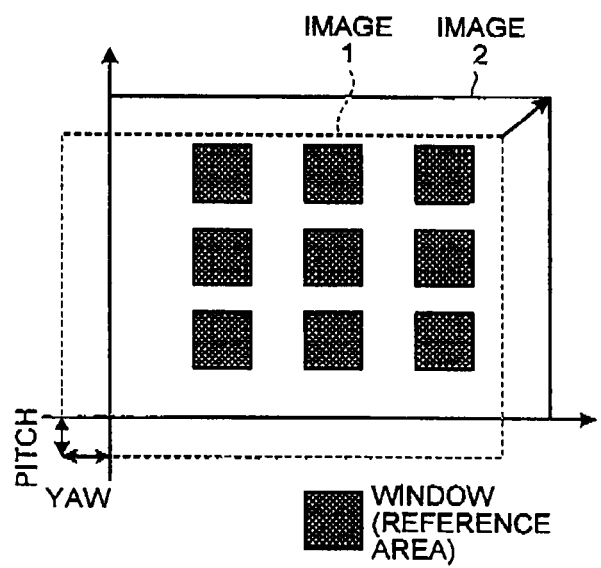
Figure 4:
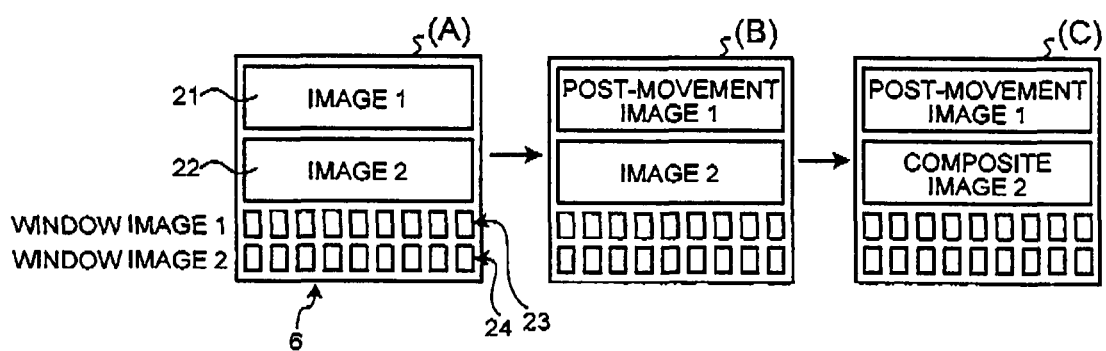
FIG. 4 is a schematic view for explaining a usage of a frame memory when two images are processed continuously.

Next, hand shake correction processing in the image processing device 4 will be described with reference to FIGS. 2 to 8. FIG. 2 is a view for explaining a reference area of an image for hand shake correction and a moving direction of an image. FIGS. 2A and 28 are views for explaining the reference area of the image for hand shake correction. FIG. 2B is a view for explaining the moving direction of the image. FIG. 3 is a view for explaining a processing flow of the hand shake correction in the image processing device 4. Especially, FIG. 3 shows a case where two images are processed continuously. FIG. 4 is a schematic view for explaining a usage of the frame memory 6. As shown in FIG. 4, the frame memory 6 is provided with two image memories 21 and 22 and two reference memory groups 23 and 24 which store images of a plurality of reference areas of images stored in the two image memories 21 and 22.

In a hand shake correction mode, if a shutter speed is not reduced, when a shutter operation is performed under such a dark taking condition that sufficient sensitivity is not obtained, and noise is increased, two images are continuously taken at high speed so that a subject is not blurred. A first taken RAW image is referred to as an image 1, and a second taken RAW image is referred to as an image 2.

As shown in FIG. 2A, a plurality of (nine in the example shown in FIG. 2A) the reference areas for hand shake correction (hereinafter referred to as "window") are set in an image frame. The number of the window is not limited to this example. The window may be set around the center of the angle of view in a region where an image height is up to 70% as a region with a tendency to suppress deterioration of lens performance. According to this constitution, a memory capacity and a calculation time are reduced, and, at the same time, a hand shake correction amount can be detected with high accuracy.

In FIG. 3, the images 1 and 2 input from the sensor images unit 3 are stored in the frame memory 6 (see, (A) in FIG. 4). In crop processing $11_1$ and $11_2$, a plurality of the windows shown in FIG. 2A are cut from the images 1 and 2 stored in the frame memory 6. The images cut from the images 1 and 2 are images for hand shake correction used when the hand shake correction amount is calculated and referred to respectively as window images 1 and window images 2. The window images 1 and the window images 2 are stored in the frame memory 6 (see, (A) in FIG. 4). When the calculation time is reduced, or when the capacity of the frame memory is reduced, the number of the windows may be reduced, or the area of the window may be reduced.

Next, in demosaicing (image restoration) processing $12_1$ and $12_2$, the demosaicing processing is applied to a plurality of the window images 1 and 2 while paying attention to a G signal, and a G image constituted only of the G signal is generated. The window images 1 and 2 of the G image are used in the following processing. In the present embodiments, the demosaicing processing means that all the G images are restored by interpolation etc from an image in which R and B signals are omitted and there is only a G signal.

In a frame matching processing 13, as shown in FIG. 2B, the image 1 is moved every constant amount in pitch and yaw directions. The pitch means a Y-axis (longitudinal) direction, and the yaw means an X-axis (lateral) direction. A difference of a signal value between the window images 1 after movement and the window images 2 is calculated for each window movement by movement, and moving directions and movement amounts of the pitch and the yaw in which the difference is minimum are calculated. The window images 1 are cut from the image 1 every movement of the image 1 to be overwritten in the frame memory 6. The difference of the signal value is calculated using the window images 1 and the window images 2 stored in the frame memory 6. When the images 1 and 2 overlap with high accuracy, the difference of the signal value between the window images 1 and the window images 2 is minimum.

The moving directions and the movement amounts correspond to the hand shake correction amount. The image 1 is moved by the calculated moving directions and movement amounts of the pitch and the yaw, and, namely, the hand shake correction of the image 1 is performed with the calculated hand shake correction amount. The image 1 after movement (hereinafter referred to as a "post-movement image 1") is overwritten in the image 1 in the frame memory 6 (see, (B) in FIG. 4).

Finally, in a merge processing 14, the post-movement image 1 and the image 2 are composed to generate a composite image 2. The composite image 2 is overwritten in the image 2 in the frame memory 6 (see, (C) in FIG. 4).

According to the above constitution, the electronic hand shake correction can be performed using the frame memory 6 having a small capacity, and a high-definition image with a high image resolution and with little noise can be obtained.

Figure 5:
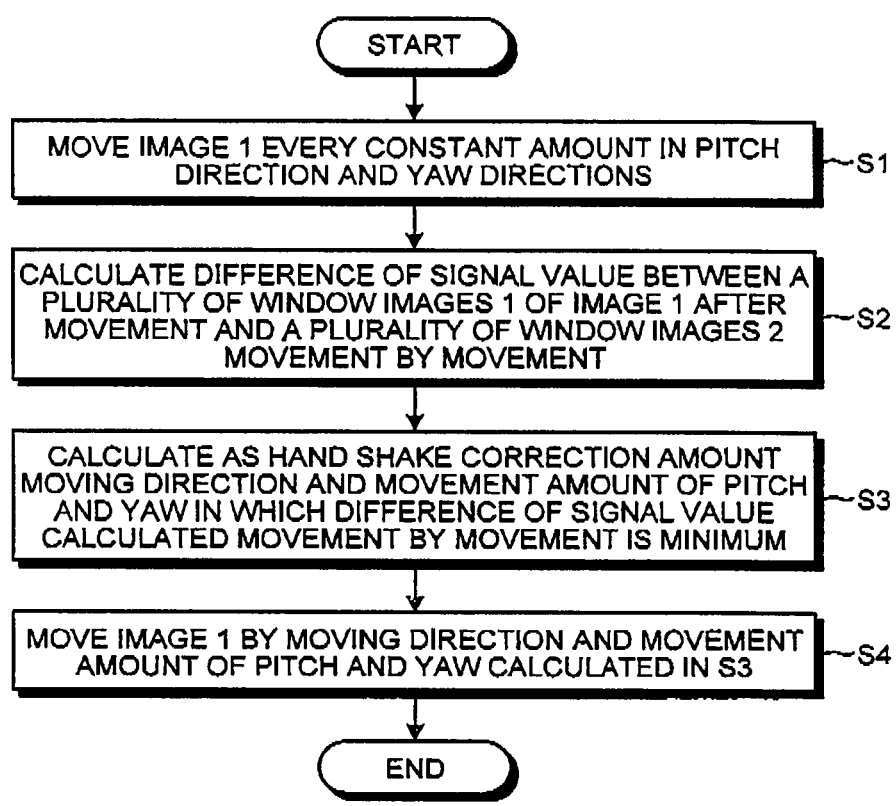
FIG. 5 is a flow chart for explaining a flow of frame matching processing in the image processing device.

FIG. 5 is a flow chart for explaining a flow of the frame matching processing 14 in the image processing device 4. In FIG. 5, the image 1 is first moved every constant amount in the pitch and yaw directions within a specified range (step S1). As the image 1 is moved more finely, blur can be corrected with higher accuracy, and thus it is preferable that the image 1 is moved every one pixel.

Next, the difference of the signal value between the window images 1 of the post-movement image 1 and the window images 2 is calculated movement by movement (step S2). It is preferable that the difference of the signal value is the sum of squares of differences. When the calculation time is reduced, the difference of the signal value may be an average value of differences.

The moving directions and movement amounts of the pitch and the yaw in which the difference of the signal value calculated movement by movement is minimum are calculated as the hand shake correction amount (step S3). The image 1 is moved to the moving directions and movement amounts of the pitch and the yaw calculated in step S3 (step S4), and, namely, the image 1 is corrected by the hand shake correction amount.

Figure 6:
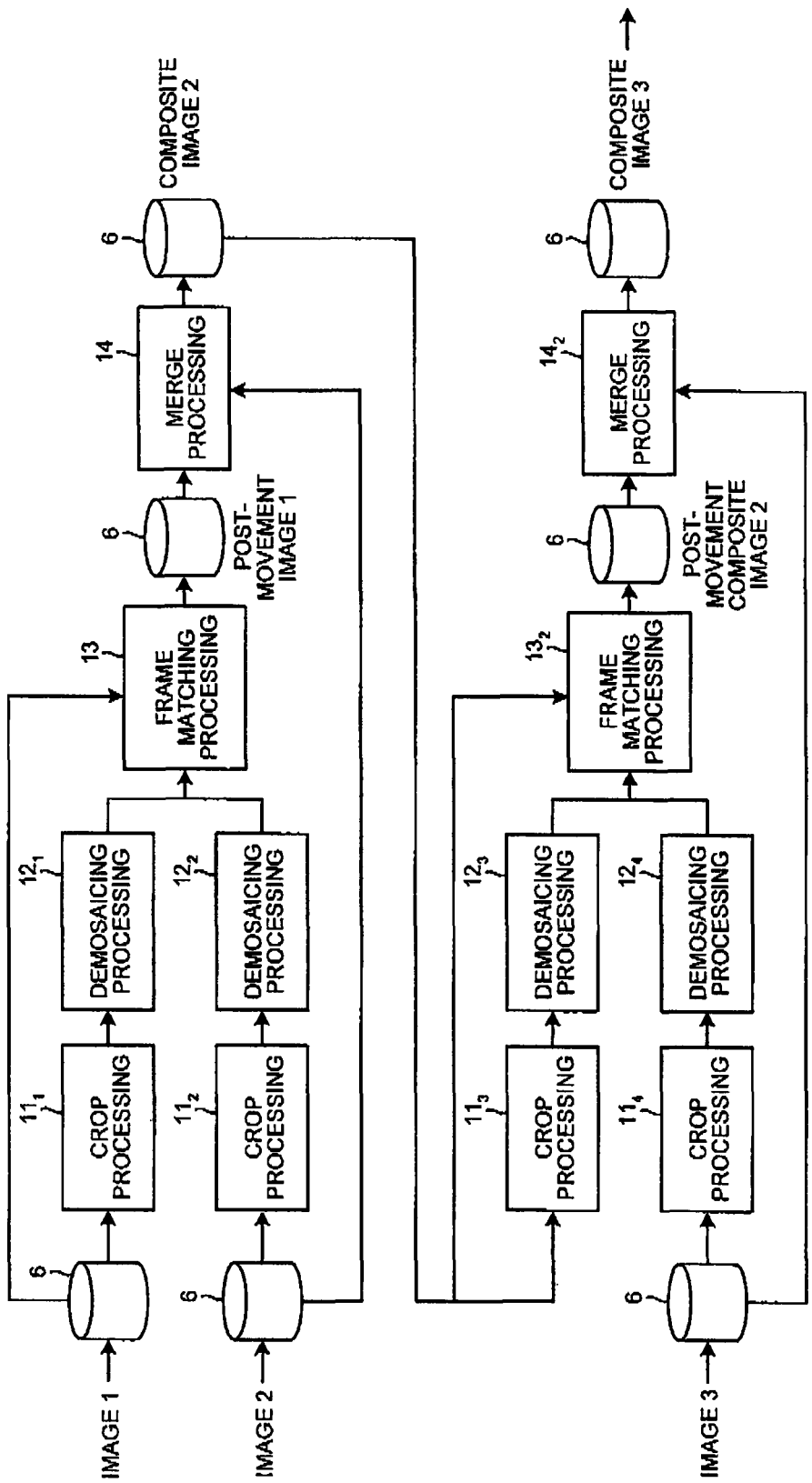
FIG. 6 is a view for explaining a processing flow of the hand shake correction in the image processing device when three images are processed continuously.
Figure 7:
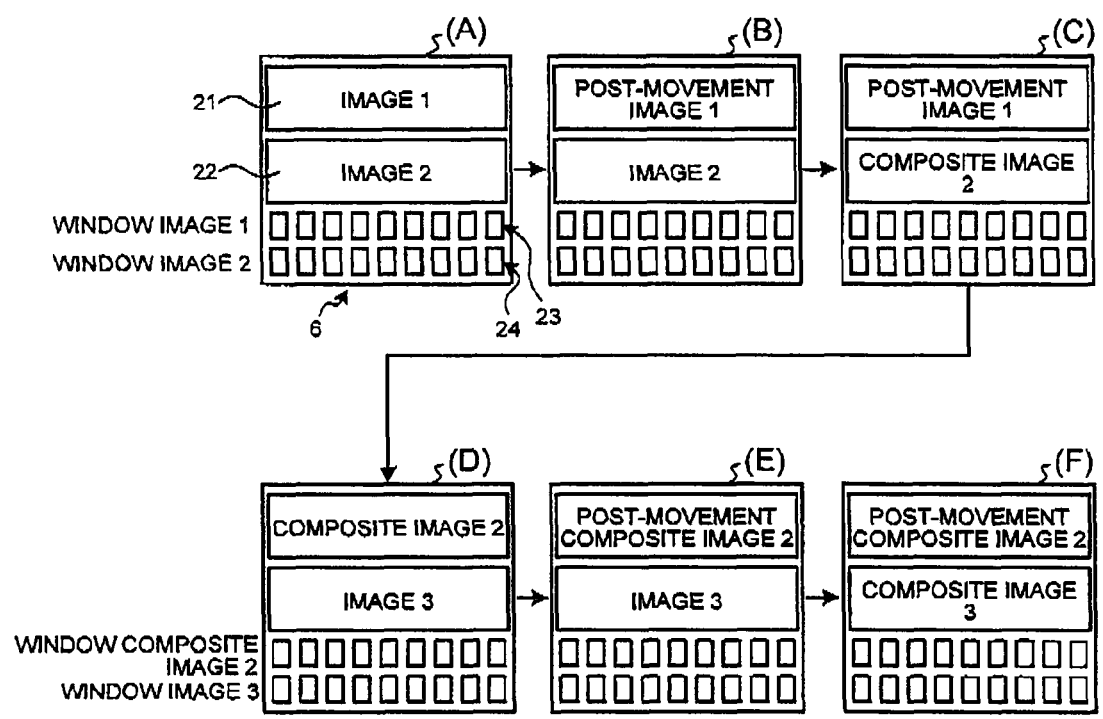
FIG. 7 is a schematic view for explaining a usage of the frame memory when three images are processed continuously.

In the above embodiment, although the two images are processed continuously, three or more images may be processed continuously. FIG. 6 is a view for explaining a processing flow of the hand shake correction in the image processing device 4 when three images are processed continuously. FIG. 7 is a schematic view for explaining a usage of the frame memory 6 when three images are processed continuously.

When a shutter is operated, three images are continuously photographed and taken in. Since the processing of the first and second images is similar to that in FIGS. 2 and 3, the processing of the third image will be described. A RAW image taken as the third image is referred to as an image 3.

In FIG. 6, the image 3 is overwritten in the post-movement image 1 in the frame memory 6 (see, (D) in FIG. 7). In crop processing $11_3$ and $11_4$, processing of cutting each window shown in FIG. 2A is applied to the composite image 2 and the image 3 stored in the frame memory 6. The image cut from the composite image 2 and the image cut from the image 3 are referred to respectively as a window composite image 2 and a window image 3. The window composite image 2 and the window image 3 are stored in the frame memory 6 (see, (D) in FIG. 7).

Next, in demosaicing processing $12_3$ and $12_4$, the demosaicing processing is applied to the window composite image 2 and the window image 3 while paying attention to the G signal, and the G image constituted only of the G signal is generated.

In frame matching processing $13_2$, the window composite image 2 is moved every constant amount in the pitch and yaw directions. The difference of the signal value between the window composite images 2 of the composite image 2 after movement (hereinafter referred to as a "post-movement composite image 2") and the window images 3 of the image 3 is calculated movement by movement, and the moving directions and movement amounts of the pitch and the yaw in which the difference is minimum are calculated. The composite image 2 is moved by the calculated moving directions and movement amounts in the pitch and yaw directions. The post-movement composite image 2 is overwritten in the composite image 2 in the frame memory 6 (see, (E) in FIG. 7).

Finally, in merge processing $14_2$, the post-movement composite image 2 and the image 3 are composed to generate a composite image 3. The composite image 3 is overwritten in the image 3 in the frame memory 6 (see, (F) in FIG. 7). When four or more images are processed continuously, a similar method can be used. As the number of images processed continuously increases, an image with a higher image resolution and with less noise is obtained.

As described above, according to the first embodiment, the continuously taken images 1 and 2 are stored in the frame memory 6, and images are cut as the images for correction from the reference areas of the images 1 and 2 stored in the frame memory 6. Such a hand shake correction amount that the images 1 and 2 overlap with high accuracy is calculated using the images for correction of the plurality of images 1 and 2. The image 1 is corrected by the calculated hand shake correction amount, and the corrected image 1 is overwritten in the image 1 stored in the frame memory 6. The corrected images 1 and 2 are composed to generate a composite image, and the composite image is overwritten in the image 2 stored in the frame memory 6. Therefore, the electronic hand shake correction can be executed with high accuracy, using a minimum frame memory, and a high-definition image with a high image resolution and with little noise can be obtained.

Further, according to the first embodiment, a G pixel of the images for correction of the images 1 and 2 is interpolated, and a G image for correction is restored. The hand shake correction amount is calculated using the restored G image for correction. Consequently, a high accuracy hand shake correction amount can be obtained with a small calculation amount.

Furthermore, according to the first embodiment, when the image 1 is moved, the difference of the signal value between the images for correction of the image 1 after movement and the images for correction of the image 2 is calculated movement by movement, and the moving direction and moving distance in which the difference is minimum are calculated as the hand shake correction amount. Therefore, the high accuracy hand shake correction amount can be calculated.

Furthermore, according to the first embodiment, the reference areas are arranged around the center of the angle of view in the region where the image height is up to 70% as the region with a tendency to suppress deterioration of lens performance. Therefore, the memory capacity and the calculation time are reduced, and, at the same time, the hand shake correction amount can be calculated with high accuracy.

Figure 8:
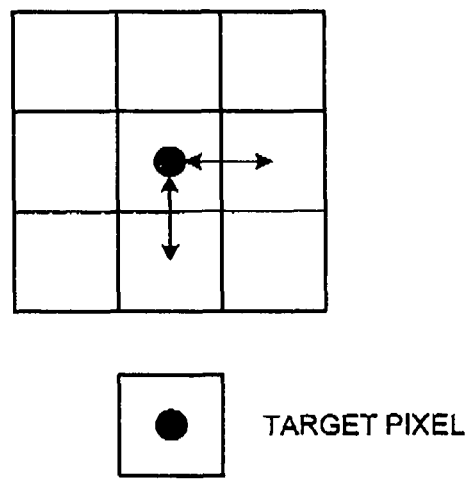
FIG. 8 is a view for explaining a method of calculating motion blur.

When the continuously taken images include a subject which has moved at a higher speed than the shutter speed, blur (motion blur) of the subject occurs in a screen, and the hand shake sometimes cannot be completely corrected by the above hand shake correction processing. Thus, image in which the motion blur occurs due to the subject having moved at a higher speed than the shutter speed is removed, and a composite image may be generated from only images with no motion blur. FIG. 8 is a view for explaining a method of calculating the motion blur.

Specifically, for example, in FIG. 7, the motion blur is detected from the window images 1 and 2 of the images 1 and 2. In the detection of the motion blur, a difference value of the brightness or G signal between adjacent pixels is obtained in each of the window images 1 and 2. For example, as shown in FIG. 8, the difference value between the right and lower pixels of a target pixel is obtained. This processing is performed in the window images 1 and 2, and a value obtained by adding up all the difference values is calculated for each of the images 1 and 2.

The obtained values are compared between the images 1 and 2. When the larger value is 100%, and the smaller value is not more than a predetermined value (for example, 80%), it is determined that there is the motion blur, and the image is removed to generate a composite image. For example, when the image 2 includes the motion blur, the composite image is generated by the images 1 and 3.

As described above, the hand shake correction is performed using an image with no motion blur of a plurality of images, whereby even when a taken image includes a subject which has moved at a higher speed than the shutter speed, the high accuracy hand shake correction can be performed.

Second Embodiment

Figure 9:
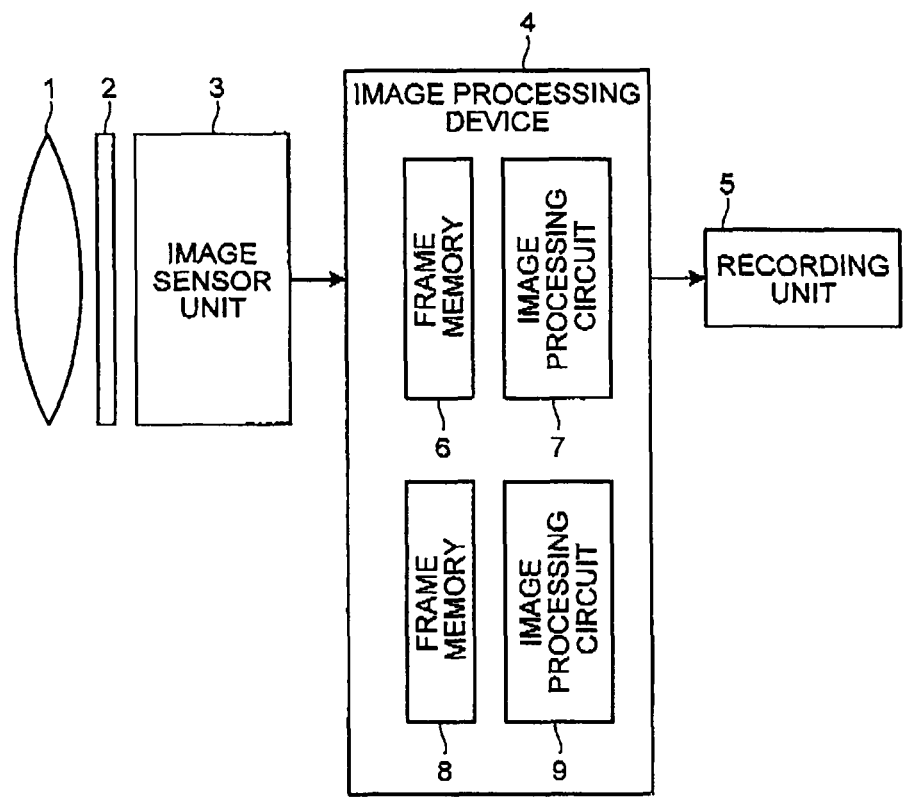
FIG. 9 is a block diagram showing an image recording apparatus provided with an image processing device according to a second embodiment.

FIG. 9 is a block diagram showing one example of a configuration of an image recording apparatus provided with an image processing device 4 according to a second embodiment. In FIG. 9, the components having functions equivalent to those in FIG. 1 are assigned the same reference numerals, and only the different points will be described. As shown in FIG. 9, the image processing device 4 according to the second embodiment has a constitution in which a frame memory 8 and an image processing circuit 9 are added to the image processing device 4 according to the first embodiment (see, FIG. 1). Since the image processing device 4 according to the second embodiment has two sets of the frame memory and the image processing circuit, the hand shake correction processing is performed in parallel, whereby the processing time can be reduced.

In the first embodiment, the crop processing 11 to the merge processing 14 shown in FIG. 2 are repeatedly executed, whereby the hand shake correction processing is performed using the frame memory with a minimum capacity. Meanwhile, in the second embodiment, two sets of the frame memory and the image processing circuit are provided, so that the crop processing 11 to the merge processing 14 shown in FIG. 2 are executed in parallel, whereby the processing time can be reduced to half. FIG. 10 shows a flow in which a shutter is operated twice in a short time to take two images, and, thus, to perform the hand shake correction. When a circuit size, cost, and a size have allowances, a plurality of sets of the frame memory and the image processing circuit are provided, whereby the processing speed can be increased by times of the number of sets.

In the first and second embodiments, a recording medium in which a program code of software realizing the functions of the above image processing device is recorded is supplied to a system or a device, and a computer (or CPU, MPU, or DSP) of the system or the device may execute the program code stored in the recording medium, whereby the functions of the image processing device can be realized.

In that case, the program code itself read from the recording medium realizes the functions of the image processing device, and the program code or the recording medium storing the program constitutes the present embodiments. As the recording medium for supplying the program code, an FD, a hard disk, an optical disk, a magneto-optical disk, a CD-ROM, a CD-R, a magnetic tape, a nonvolatile memory, an optical recording medium such as a ROM, a magnetic recording medium, a magneto-optical recording medium, and a semiconductor recording medium may be used.

The program code read by the computer is executed, whereby the functions of the above image processing device are realized. As another case in which the functions of the image processing device is realized, an OS (operating system) operating on the computer performs a part of or whole actual processing based on an instruction of the program code, and the processing realizes the functions of the image processing device.

As still another case in which the functions of the image processing device is realized, the program code read from the recording medium is written in a memory of a function enhancement board inserted in the computer or a function enhancement unit connected to the computer; thereafter, a CPU of the function enhancement board or the function enhancement unit performs a part of or whole actual processing based on an instruction of the program code, and the processing realizes the functions of the image processing device.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method, comprising:
   storing, in a frame memory, first and second images of continuously taken N (where, N is not less than 2) images;
   cutting images as first images for correction from a plurality of different reference areas of the first image stored in the frame memory and cutting images as second images for correction from a plurality of different reference areas of the second image stored in the frame memory, the plurality of different reference areas of the first image corresponding to the plurality of different reference areas of the second image;
   interpolating only G pixels of the first images for correction and the second images for correction, and restoring G images for correction;
   calculating a hand shake correction amount using the restored G images for correction, and correcting the first image with the calculated hand shake correction amount to generate a corrected first image;
   overwriting the first image stored in the frame memory with the corrected first image;
   composing the corrected first image and the second image to obtain a composite image; and
   overwriting the second image stored in the frame memory with the composite image.

2. The image processing method according to claim 1, wherein when there is a movement between the first image and the second image, a difference of a signal value between the plurality of images for correction of the first image after the movement and the plurality of images for correction of the second image is calculated movement by movement, and a moving direction and a moving distance in which the difference is minimum are calculated as the hand shake correction amount.

3. The image processing method according to claim 1, further comprising detecting an image in which motion blur occurs from the continuously taken N images,
   wherein at the composing the composite image, an image in which the motion blur is detected is not used when the composite image is generated.

4. The image processing method according to claim 1, further comprising:
   overwriting the corrected first image stored in the frame memory with a third image;
   cutting an image as an image for correction from a plurality of reference areas of the composite image and the third image stored in the frame memory;
   calculating the hand shake correction amount and correcting the composite image with the calculated hand shake correction amount to generate a corrected composite image;
   overwriting the composite image stored in the frame memory with the corrected composite image;
   composing the corrected composite image and the third image to obtain a new composite image; and
   overwriting the third image stored in the frame memory with the new composite image.

5. An image processing device, comprising:
   a frame memory which stores first and second images of continuously taken N (where, N is not less than 2) images;
   a crop unit that cuts images as first images for correction from a plurality of different reference areas of the first image stored in the frame memory and that cuts images as second images for correction from a plurality of different reference areas of the second image stored in the frame memory, the plurality of different reference areas of the first image corresponding to the plurality of different reference areas of the second image;
   an interpolator unit interpolating only G pixels of the first images for correction and the second images for correction and restoring G images for correction;
   a hand shake correction unit that calculates a hand shake correction amount using the restored G images for correction, and corrects the first image with the calculated hand shake correction amount to generate a corrected first image; and
   an image composing unit that generates a composite image in which the corrected first image and the second image are composed.

6. The image processing device according to claim 5, wherein when there is a movement between the first image and the second image, the hand shake correction unit calculates movement by movement a difference of a signal value between the plurality of images for correction of the first image after the movement and the plurality of images for correction of the second image and calculates, as the hand shake correction amount, a moving direction and a moving distance in which the difference is minimum.

7. The image processing device according to claim 5, further comprising a detecting unit that detects an image in which motion blur occurs from the continuously taken N images, wherein the image composing unit does not use an image in which the motion blur is detected when the image composing unit generates the composite image.

8. The image processing device according to claim 5, wherein the frame memory comprises two image memories configured to store the first and second images and two reference memory groups corresponding to the two image memories and configured to store an image for correction in the plurality of reference areas.

9. An image processing method, comprising:
   storing, in a frame memory, first and second images of continuously taken N (where, N is not less than 2) images;
   cutting images as first images for correction from a plurality of different reference areas of the first image stored in the frame memory and cutting images as second images for correction from a plurality of different reference areas of the second image stored in the frame memory, the plurality of different reference areas of the first image corresponding to the plurality of different reference areas of the second image;
   calculating a hand shake correction amount that using the cut first images for correction and the cut second images for correction, and correcting the first image with the calculated hand shake correction amount;
   overwriting the first image stored in the frame memory with the corrected first image;
   composing the corrected first image and the second image to generate a composite image;
   overwriting the second image stored in the frame memory with the composite image;
   overwriting the corrected first image stored in the frame memory with a third image;
   cutting images as composite images for correction from a plurality of different reference areas of the composite image stored in the frame memory and cutting images as third images for correction from a plurality of different reference areas of the third image stored in the frame memory, the plurality of different reference areas of the composite image corresponding to the plurality of different reference areas of the third image;
   calculating a hand shake correction amount using the cut composite images for correction and the cut third images for correction, and correcting the composite image with the calculated hand shake correction amount to generate a corrected composite image;
   overwriting the composite image stored in the frame memory with the corrected composite image;
   composing the corrected composite image and the third image to generate a new composite image; and
   overwriting the third image stored in the frame memory with the new composite image.

10. The image processing method according to claim 1, the first image is stored in a first area of the frame memory and the second image is stored in a second area of the frame memory.

11. The image processing method according to claim 9, the first image is stored in a first area of the frame memory and the second image is stored in a second area of the frame memory.

* * * * *